(12) United States Patent
Krishnaswamy et al.

(10) Patent No.: US 7,984,153 B2
(45) Date of Patent: Jul. 19, 2011

(54) SYSTEM AND METHOD FOR ANALYZING DOMINO IMPACT OF NETWORK GROWTH

(75) Inventors: Murali Krishnaswamy, Piscataway, NJ (US); Sambasiva Bhatta, Tampa, FL (US); Brian T. Wade, Flemington, NJ (US); Joseph Muccilo, Cliffside Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 204 days.

(21) Appl. No.: 12/490,460

(22) Filed: Jun. 24, 2009

(65) Prior Publication Data

US 2010/0332642 A1    Dec. 30, 2010

(51) Int. Cl.
    *G06F 15/173*    (2006.01)
(52) U.S. Cl. .................. 709/226; 709/223; 709/224
(58) Field of Classification Search .................. 370/238, 370/254, 351; 379/221.06, 221.07, 221.08; 709/220–226
    See application file for complete search history.

(56) References Cited

U.S. PATENT DOCUMENTS

| | | | | |
|---|---|---|---|---|
| 6,628,622 | B1 * | 9/2003 | Bulick et al. | 370/254 |
| 7,580,712 | B2 * | 8/2009 | Nordling | 455/446 |
| 7,808,903 | B2 * | 10/2010 | Krishnaswamy et al. | 370/232 |
| 2005/0132044 | A1 * | 6/2005 | Guingo et al. | 709/225 |
| 2005/0132051 | A1 * | 6/2005 | Hill et al. | 709/226 |
| 2006/0276195 | A1 * | 12/2006 | Nordling | 455/446 |
| 2007/0094381 | A1 * | 4/2007 | Weiss et al. | 709/224 |
| 2008/0101242 | A1 * | 5/2008 | Sadler et al. | 370/238 |
| 2009/0222540 | A1 * | 9/2009 | Mishra et al. | 709/222 |
| 2009/0319654 | A1 * | 12/2009 | Gonzalez et al. | 709/224 |

* cited by examiner

*Primary Examiner* — Joseph E Avellino
*Assistant Examiner* — Aftab Nasir Khan

(57) ABSTRACT

A system and method for analyzing domino impact of network growth including collecting, via a collector module, network information from one or more domains of a communication network. Also, the system and method may include processing, via an analytical module, the network information in order to determine a domino impact of growth of the communication network, wherein processing the network information comprises determining a number of lower network resources and a number of higher network resources within plurality types of networks in the one or more domains of the communication network and outputting, via a presentation module, the processed network information collected from the one or more domains of the communication network.

17 Claims, 7 Drawing Sheets

US 7,984,153 B2

SYSTEM AND METHOD FOR ANALYZING DOMINO IMPACT OF NETWORK GROWTH

BACKGROUND INFORMATION

Network planning and design may be an iterative process including topological design, network-synthesis, and network realization. Network planning and design may be necessary to ensure that the network infrastructure may be able to support additional subscribers and services. During the network planning and design process, a network planner may estimate services and traffic loads (e.g., a number of subscribers) that a network infrastructure may support. Often, a network planner may forecast a growth in services and traffic loads of the network. The growth information associated with the services and traffic loads may be used to determine a size (e.g., amount of network resources) of the network. The determination of the size of the network may involve various factors and thus making the determination difficult and inaccurate.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

An exemplary embodiment provides a system and process for analyzing domino impact of network growth. In an exemplary embodiment, the system and process may allow user (e.g., a network administrator or a network planner) to calculate the domino impact analysis of the growth of a communication network. Also, the system and process may allow user to determine a number of network resources needed to support various services and traffic loads of the communication network. Further, the system and process may allow user to determine a number of network resources needed in order to satisfy the demand of an increase in various services and traffic loads of the communication network.

A communication network may include a plurality of network elements (NEs) coupled together by a plurality of links (e.g., physical links or logical links). The system and process may determine a quantity of network elements and a capacity of links coupled to the network elements that may be required in order to support an increase in services and traffic loads of a network. For example, a network may be partitioned into one or more domains or regions based on size, complexity, services provided, or traffic load of a network. Each domain of the network may be further partitioned into various networks, such as, an edge or access network ("$N_1$ network"), an aggregation network ("$N_2$ network"), a core network ("$N_3$ network"), and an application network ("$N_4$ network"). In an exemplary embodiment, an edge or access network may be a network within a domain associated with one or more customers. For example, the edge or access network may receive traffic from one or more customers and transmit traffic to the customers in the domain. The aggregation network may collect one or more incoming lower bandwidth traffic (e.g., from the edge or access network) into higher bandwidth traffic. Also, the aggregation network may perform various traffic engineering functions, such as, quality of service ("QoS"), service level agreement ("SLA"), or other traffic engineering functions. The core network may be a backbone network which may perform high speed switching across various domains of the network. The application network may include various network elements and protocols for providing various services (e.g., semantic conversion between associated application processes). For example, the application network may provide services including virtual file, virtual terminal, job transfer, and manipulation of protocols.

Figure 1:
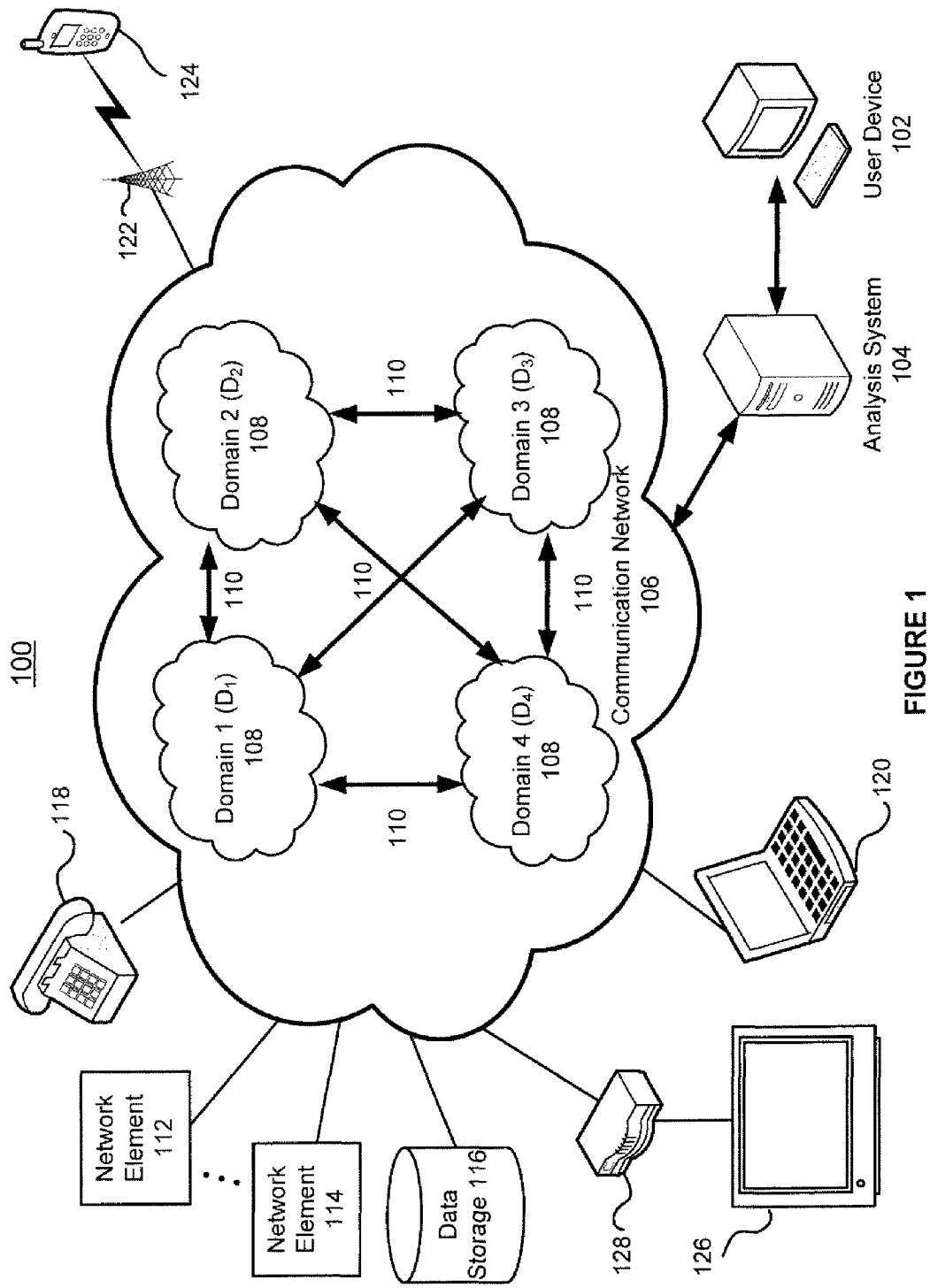
FIG. 1 is a schematic diagram illustrating a system for analyzing domino impact of a communication network growth according to a particular embodiment.

FIG. 1 is a schematic diagram illustrating a system for analyzing domino impact of a communication network growth according to a particular embodiment. As illustrated in FIG. 1, system 100 may include one or more user devices 102 which may interact with the communication network 106 via an analysis system 104. The communication network 106 may be partitioned into a plurality of domains 108 (e.g., Domain 1 ("$D_1$"), Domain 2 ("$D_2$"), Domain 3 ("$D_3$"), and Domain 4 ("$D_4$")). The plurality of domains 108 may be coupled to each other via one or more links 110 to provide one or more services (e.g., data service, voice service, and video service) for customers. The one or more links 110 may be a logical link (e.g., links within a single network resource) or a physical link (e.g., links coupling multiple network resources). As illustrated, communication network 106 may be communicatively coupled with one or more devices including network element 112, network element 114, data storage 116, telephone 118, and computer 120. Other devices may communicate with communication network 106 via one or more intermediary devices, such as transmitter/receiver 122. Wireless device 124 may communicate with communication network 106 via the transmitter/receiver 122. Television 126 may communicate with communication network 106 via set-top box 128. In an exemplary embodiment, a user may be associated with the one or more user devices 102 and submit one or more queries/requests to the analysis system 104 to analyze the domino impact of the growth of the communication network 106. The analysis system 104 may access the plurality of domains 108 of the communication network 106 and collect network information to analyze the domino impact of the growth of the communication network 106. The analysis system 104 may process the collected network information in order to determine a number of network resources needed to support various services and traffic loads of the communication network 106.

The required quantity of network resources in the communication network 106 may be calculated via a plurality of methods. For example, the number of network resources in the communication network 106 may be calculated based on a number of provisioned connections (e.g., a number of network resources located at the edge or access network coupled to the customer premises equipments ("CPE")). Also, the number of network resources in the communication network 106 may be calculated by monitoring traffic flow in one or more provisioned connections. By monitoring the traffic flow in one or more provisioned connections of the network resources, a network operator may determine whether the monitored provisioned connections are being used, and if the monitored provisioned connections are being used how much capacity (e.g., bandwidth) may be unused. In an exemplary embodiment, the number of network resources in the communication network 106 may be calculated based on a number of provisioned connections method or monitoring traffic flow method.

The one or more user devices 102 may be a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with the analysis system 104 via one or more networks (not shown) as known in the art. A user associated with the one or more user devices 102 may interactively submit one or more queries/requests to collect network information from the plurality of domains 108 of the communication system 106. Also, the user may view various types of network information collected from the plurality of domains 108 within the communication network 106 via the one or more user devices 102. The user may further view various analyses of domino impact of growth of the communication network 106 provided by the analysis system 104 via the one or more user devices 102.

The analysis system 104 may include one or more servers. For example, the analysis system 104 may include a UNIX based servers, Windows 2000 Server, Microsoft IIS server, Apache HTTP server, API server, Java sever, Java Servlet API server, ASP server, PHP server, HTTP server, Mac OS X server, Oracle server, IP server, or other independent server to collect network information from the plurality of domains 108 of the communication system 106 and analyze the domino impact of the growth of the communication network 106 based on the collected network information. Also, the one or more servers of the analysis system 104 may be located at one location or located remotely from each other.

The communication network 106 may be coupled to the analysis system 104. The network 106 may be a wireless network, a wired network or any combination of wireless network and wired network. For example, the communication network 106 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, the communication network 106 may include, without limitation, telephone line, fiber optics, IEEE Ethernet 802.3, wide area network ("WAN"), local area network ("LAN"), or global network such as the Internet. Also, the communication network 106 may support, an Internet network, a wireless communication network, a cellular network, or the like, or any combination thereof. The communication network 106 may further include one, or any number of the exemplary types of networks mentioned above operating as a stand-alone network or in cooperation with each other. The communication network 106 may utilize one or more protocols of one or more network elements to which it is communicatively coupled. The communication network 106 may translate to or from other protocols to one or more protocols of network devices. Although the communication network 106 is depicted as one network, it should be appreciated that according to one or more embodiments, the communication network 106 may comprise a plurality of interconnected networks, such as, for example, a service provider network, the Internet, a broadcaster's network, a cable television network, corporate networks, and home networks.

Transmitter/receiver 122 may be a repeater, a microwave antenna, a cellular tower, or another network access device capable of providing connectivity between two different network mediums. Transmitter/receiver 122 may be capable of sending and/or receiving signals via a mobile network, a paging network, a cellular network, a satellite network or a radio network. Transmitter/receiver 122 may provide connectivity to one or more wired networks and may be capable of receiving signals on one medium such as a wired network and transmitting the received signals on a second medium such as a wireless network.

Figure 2:
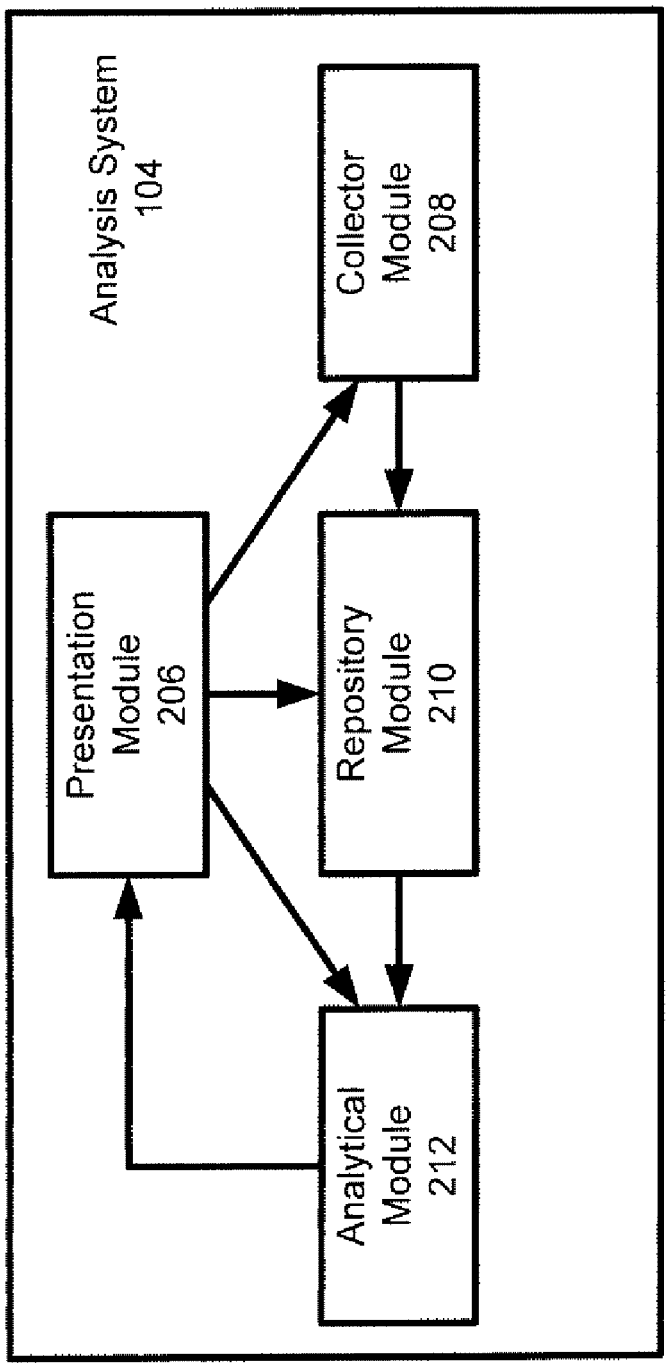
FIG. 2 is a block diagram of a hardware component of the system for analyzing domino impact of a communication network growth according to a particular embodiment.

FIG. 2 is a block diagram of a hardware component of the system for analyzing domino impact of a communication network growth according to a particular embodiment. The analysis system 104 may include a presentation module 206, a collector module 208, a repository module 210, and an analytical module 212. It is noted that the modules 206, 208, 210, and 212 are exemplary and the functions performed by one or more of the modules may be combined with that performed by other modules. The functions described herein as being performed by the modules 206, 208, 210, and 212 also may be separated and may be located or performed by other modules.

As shown in FIG. 2, the analysis system 104 may include the collector module 208 which may collect network information from the plurality of domains 108 of the communication network 106. For example, the network information may include a number of provisioned connections between one or more pairs of network elements (NEs) and a hierarchical order of the network elements (NEs). Also, network information may include bandwidth of the plurality of links coupling the one or more pairs of network elements (NEs) and various types of services supported by the plurality of links. In another exemplary embodiment, the network information may include an oversubscription factor associated the plurality of links, service and/or traffic loads allocation percentage, and/or measured traffic fill ratio associated with the plurality of links. The collector module 208 may preprocess the network information collected from the plurality of domains 108 of the communication network 106 (e.g., filter, sort, format, and aggregate. In an exemplary embodiment, the preprocessing of the evidentiary information provided by the collector module 208 may include filtering evidentiary information and eliminating undesired evidentiary information, sorting the network information in accordance with the plurality of domains 108, formatting the network information into desired format (e.g., tables, spread sheets, timeline, linear representation), and data aggregation where network information may be gathered and expressed in a summary form.

The network information may be transferred from the collector module 208 to a repository module 210. The repository module 210 may store and manage the network information transferred from the collector module 208. An analytical module 212 may access the repository module 210 to obtain the network information needed to perform one or more processes and analyze the domino impact of the growth of the communication network 106. Finally, results of the one or more processes and analyses may be transferred to the presentation module 206 and presented to a user via the one or more user devices 102. In an exemplary embodiment, the presentation module 206 may provide an interface between one or more user devices 102 and the analysis system 104. The presentation module 206 may include a user interface, e.g., a graphical user interface, to receive one or more queries/requests from the user and to provide network information to the user via the one or more user devices 102. The presentation module 206 may provide a separate or a unified graphical user interface. Also, the presentation module 206 may include an Application Programming Interface (API) to interact with the one or more user devices 102. The presentation module 206 may receive one or more queries/requests from the one or more user devices 102 to determine the domino impact of the growth of the communication network 106.

In response to receiving the one or more queries/requests from a user via the one or more user devices 102, the presentation module 206 may send one or more queries/requests (e.g., determining the domino impact of the growth of the communication network 106) to the collector module 208, the repository module 210, and the analytical module 212. In response to one or more queries/requests, the analytical module 212 may (a) receive network information from the repository module 210 and the collector module 208 based at least in part on the one or more queries/requests, (b) process and analyze the network information, and (c) provide the process result and analysis result to the presentation module 206. The presentation module 206 may provide the process result and analysis result to the one or more user devices 102 for display. As a result, system 100 may allow a user to process and analyze network information from the plurality of domains 108 of the communication network in order to analyze domino impact of the growth of the communication network 106.

The collector module 208 may interact with the plurality of domains 108 of the communication network 106. Through these interactions, the network information in each of the plurality of domains 108 of the communication network 106 may be collected. For example, the collector module 208 may sequentially or simultaneously collect network information from the plurality of domains 108 of the communication network 106. Network information collected from the plurality of domains 108 of the communication network 106 may include, but not limited to, time, date, network resources, location, bandwidth, services, traffic loads, uniform resource locator ("URL") and/or other network information in order to determine the domino impact of the growth of the communication network 106. The collector module 208 may use one or more methods to access the one or more evidence systems 110 via the data network 106. For example, the methods in which the collector module 208 may access the plurality of domains 108 of the communication network 106 may include, but not limited to, login procedures (e.g., "TELNET"), command line interface ("CLI"), simple network management protocol ("SNMP"), File Transfer Protocol ("FTP"), Secure Shell ("SSH"), structured query language ("SQL") web protocols or other methods of access and collecting evidentiary information from the plurality of domains 108 of the communication network 106.

The repository module 210 may store and manage network information provided by the collector module 208. The repository module 210 may provide an interface, e.g., a uniform interface, for other modules within the system 100 and may write, read, and search network information in one or more repositories or databases. The repository module 210 may also perform other functions, such as, but not limited to, concurrent access, backup and archive functions. Also, due to limited amount of storing space the repository module 210 may compress, store, transfer or discard the network information stored within, after a period of time, e.g., a month. The repository module 210 may provide network information to the analytical module 212. The repository module 210 may be network accessible storage and may be local, remote, or a combination thereof to network elements 104, 106, 108, 110, 112 and 114. The repository module 210 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, repository module 210 may be a database, such as an Oracle database, a Microsoft SQL Server database, a DB2 database, a MySQL database, a Sybase database, an object oriented database, a hierarchical database, or other database. The repository module 210 may utilize flat file structures for storage of data.

The analytical module 212 may retrieve network information from the repository module 210 and process such network information. The analytical module 212 may further include a plurality of sub-analytical modules to perform processing of the network information. In an exemplary embodiment, the analytical module 212 may determine the domino impact of the growth of the communication network 106. For example, the analytical module 212 may calculate a number of network resources needed in order to support services and traffic loads in the plurality of domains 108 of the communication network 106. Also, the analytical module 212 may determine a number of network resources needed for each type of networks within the plurality of domains 108 of the communication network 106.

Figure 3:
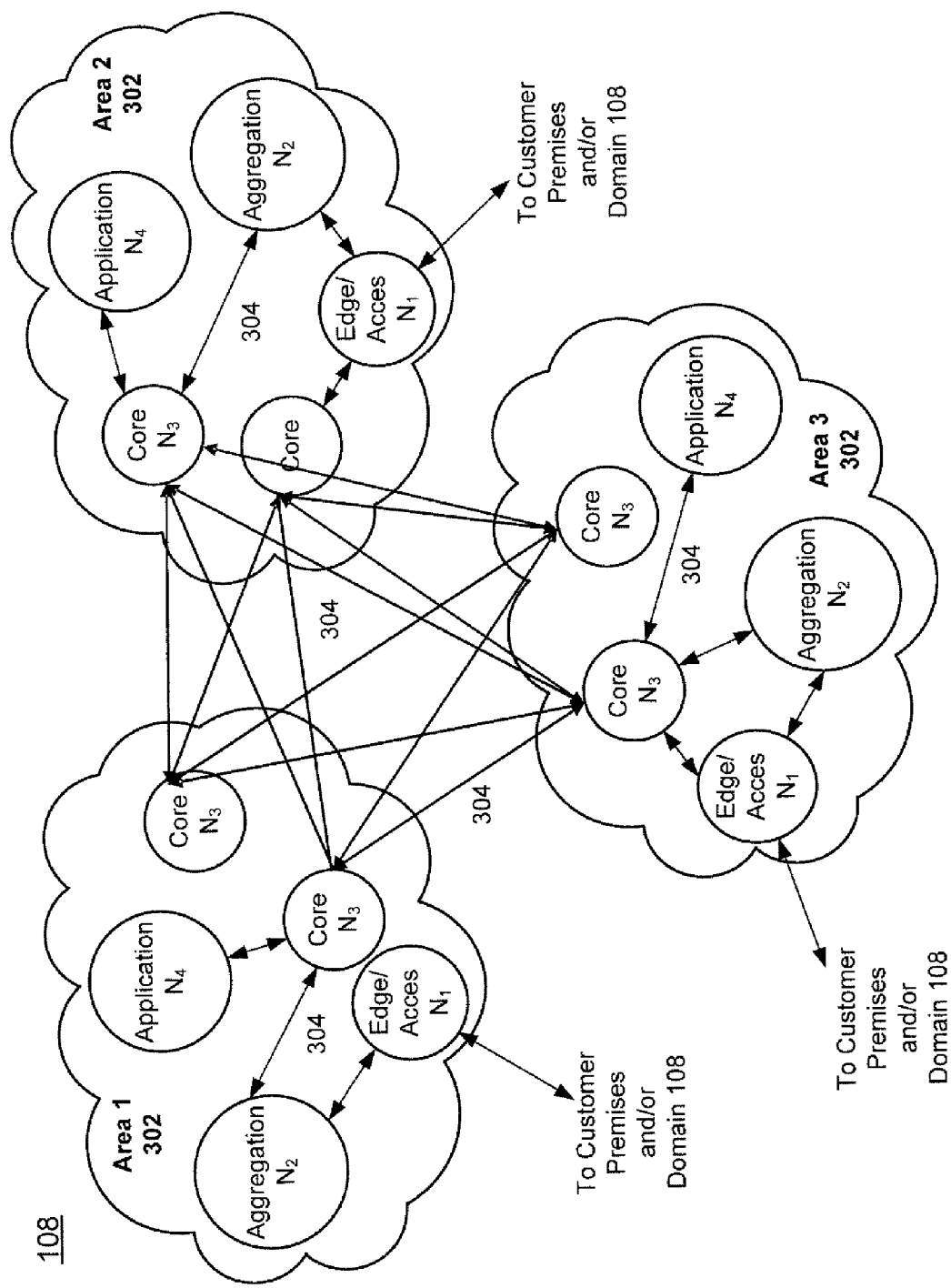
FIG. 3 is a schematic diagram illustrating a domain of a communication network according to a particular embodiment.

FIG. 3 is a schematic diagram illustrating a domain of a communication network according to a particular embodiment. As illustrated, the domain 108 of the communication network 106 may comprise one or more areas 302 (e.g., Area 1, Area 2, and Area 3) coupled to each other via one or more links 304 (e.g., physical or logical). The one or more links may be a logical link (e.g., links within a single network element) or a physical link (e.g., links coupling multiple network elements). For example, the one or more links 304 between the each area 302 may be determined by an architecture of the communication network 106. In an exemplary embodiment, an area 302 may be a geographical location (e.g., a Central Office ("CO"), Point of Presence ("POP")). Each area 302 of the domain 108 may have one or more types of networks (e.g., $N_1$, $N_2$, $N_3$, or $N_4$) having one or more network elements and a plurality of links coupling the network elements. The network resources may include one or more network elements (e.g., routers, switches, servers, optical line/network terminals ("OLT/ONT"), or other network elements to provide services) or network ports (e.g., logical network ports or physical network ports). The plurality of network resources of the one or more types of networks (e.g., $N_1$, $N_2$, $N_3$, or $N_4$) may be coupled to each other via one or more links 304 to provide one or more services (e.g., data service, voice service, or video service) for customers. The analysis system 104 may determine a quantity of network resources required in order to support an increase in services and traffic loads of communication network 106.

In another exemplary embodiment, the network resources may include one or more network ports (e.g., logical network ports or physical network ports) of the network elements (NEs) in a network (e.g., $N_1$, $N_2$, $N_3$, or $N_4$). For example, the network resources may be a set of network ports of one or more network elements (NEs) in a network (e.g., $N_1$, $N_2$, $N_3$, or $N_4$) that may provide similar services (e.g., data service, voice service, or video service). The analysis system 104 may determine a quantity of network resources required in order to support an increase in services and traffic loads of the communication network 106. Also, the analysis system 104 may determine a quantity of network elements (NEs) based on the determination of the quantity of network resources required in order to support an increase in services and traffic loads of the communication network 106.

Figure 4:
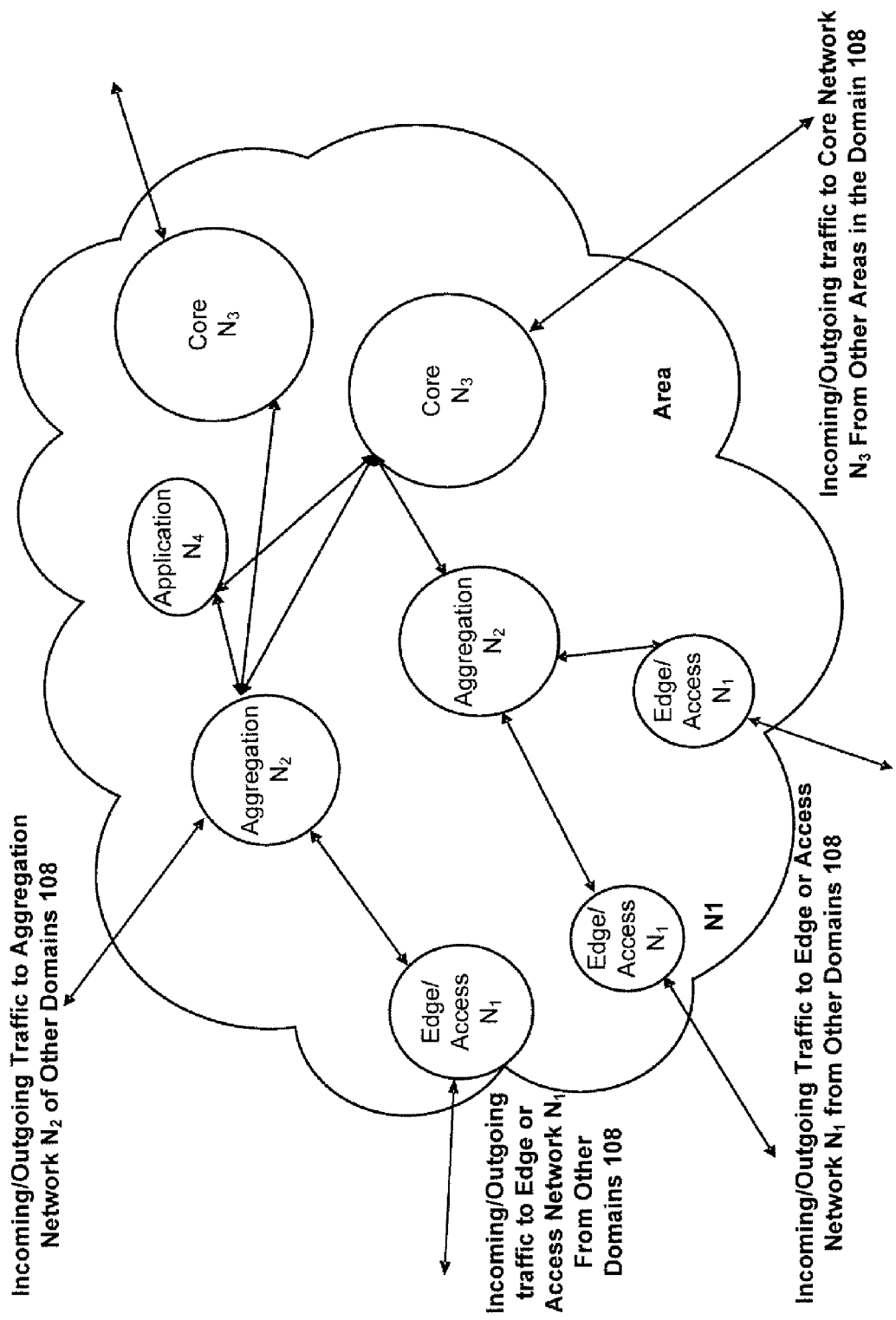
FIG. 4 is a schematic diagram illustrating an area of a domain according to a particular embodiment.

FIG. 4 is a schematic diagram illustrating an area of a domain according to a particular embodiment. For example, the various types of networks (e.g., $N_1$, $N_2$, $N_3$, or $N_4$) within an area (e.g., $A_1$, $A_2$, or $A_3$) of the domain 108 may perform various functions. For example, the various types of networks ($N_1$, $N_2$, $N_3$, or $N_4$) (e.g., from lowest level network to highest level network) may include edge or access networks, aggregation networks, core networks, and application networks. In an exemplary embodiment, the edge or access network may be coupled to the customer premises or extended to customer premises including customer premises equipments. The edge or access network ($N_1$ network) may include one or more routers or one or more optical network terminals. The one or more routers or one or more optical network terminals may include one or more ports associated with various types of services or traffic loads (e.g., data traffic, voice traffic, and video traffic). Also, the edge or access network may be coupled to other edge or access network of other domains of the communication network 106. The plurality of domains 108 of the communication network 106 may be coupled to each other via other types of networks (e.g., aggregation networks, core networks, and application networks). The edge or access network may be coupled to one or more higher level networks within the domain 108. For example, the edge or access network may be coupled to one or more aggregation networks. The aggregation networks may be coupled to a higher level network of the domain 108. The aggregation network may be coupled to one or more core networks. For example, the plurality of areas of the domain 108 may be coupled to each other via one or more core networks. The core networks may be coupled to one or more application networks.

Figure 5:
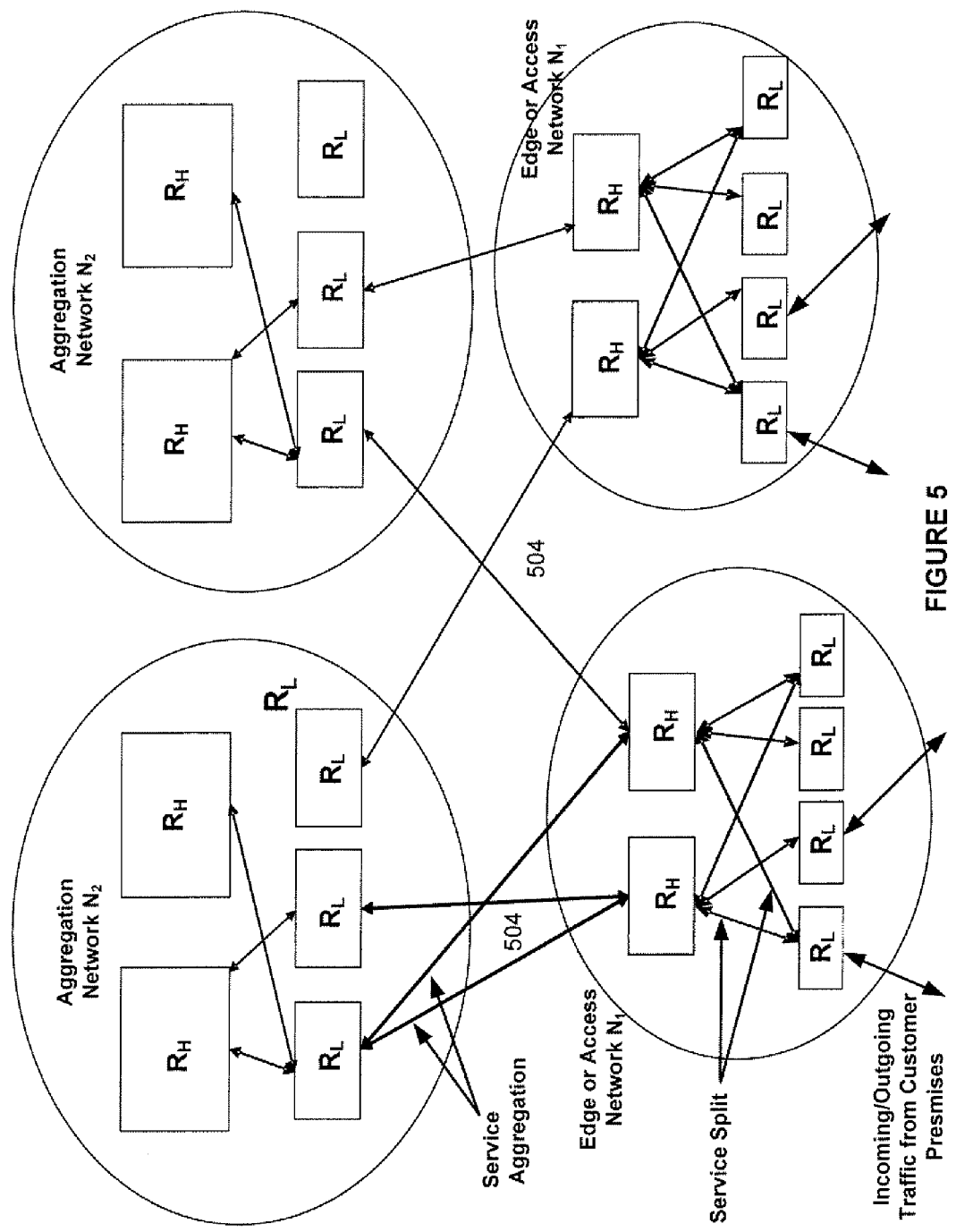
FIG. 5 is a schematic diagram illustrating various network resources in an area of a domain according to a particular embodiment.

FIG. 5 is a schematic diagram illustrating various network resources in an area of a domain according to a particular embodiment. In an exemplary embodiment, the network resources (e.g., one or more network elements or the network ports) may have one or more attributes. For example, the one or more attributes of the network resources may include a type of network that the network resources may be located. For example, the network resources may be located at edge or access network, aggregation networks, core networks, and application networks an area of the domain 108.

Also, the one or more attributes of the network resources may include a hierarchical order of various types of networks. For example, the lower level network and the higher level networks may be dependent on a location in the transmission path to and from the customer premises. In an exemplary embodiment, a network located closer to the edge or access network on a transmission path may be a lower level network when compared to a network (e.g., higher level network) located further from the edge or access network on the transmission path. Also, a network may be a lower level network and a higher level network. For example, an aggregation network may be coupled to an edge or access network and a core network. The aggregation network may be a lower lever network compared to the core network and a higher level network compared to the edge or access network. In an exemplary embodiment, the edge or access network may be a lower level network compared to the aggregation network, the core network, and the application network. Also, the application network may be a higher level network compared to the core network, aggregation network, and edge or access network.

In an exemplary embodiment, the one or more attributes of a network resource may include one or more lower network resources ("$R_L$") and one or more higher network resources ("$R_H$"). For example, the lower network resources ("$R_L$") and the higher network resources ("$R_H$") may be located in a single type of network (e.g., edge or access network), the lower network resources ("$R_L$") may be located closer to customer premises (e.g., directly coupled to the customer-premises equipments) or another domain 108 and the higher network resources ("$R_H$") may be located further from the customer premises (e.g., coupled to the customer-premises equipments via the lower network resources). In an exemplary embodiment, the lower network resources ("$R_L$") may be coupled to another domain 108 and/or customer-premises equipments. The higher network resources ("$R_H$") in the edge or access network may be coupled to one or more lower network resources ("$R_L$") of one or more higher level networks ("HLN") (e.g., aggregation network, core network, and/or application network). Also, the lower network resource ("$R_L$") of the aggregation network may be coupled to the higher network resource ("$R_H$") of the edge or access network. The higher network resource ("$R_H$") of the aggregation network may be coupled to one or more lower network resources ("$R_L$") of one or more higher level network ("HLN") (e.g., core network, and/or application network). For example, the lower network resources ("$R_L$") may support lower bandwidth services and the higher network resources ("$R_H$") may support higher bandwidth services. The higher network resource ("$R_H$") may support higher bandwidth services in order to provide multiplexing of services and aggregation of traffic loads from lower network resources ("$R_L$"). In an exemplary embodiment, a plurality of lower network resources ("$R_L$") (e.g., OC-3 ports) may be coupled to a single higher network resources ("$R_H$") (e.g., OC-48 port). In other exemplary embodiments, the bandwidth of the higher network resources ("$R_H$") may be less than the bandwidth of the lower network resources ("$R_L$").

The network resources in an area of the domain 108 may provide one or more services (e.g., video services, voice services, and data services). Also, the one or more attributes of the network resources may include a service type that the network resources may support. A plurality of network resources may form a logical group to provide one or more services (e.g., video services, voice services, and data services). For example, one or more network resources may be data ports (e.g., 32 number of gigabit Ethernet ("Gig-E") ports). Also, one or more network resources may be voice-over-Internet protocol ("VoIP") ports (e.g., 48 VoIP ports). Also, the one or more network resources may be data ports that may support voice-over-Internet service. In other embodiments, the one or more network resources that provide a service may have various bandwidth capacities. For example, the one or more network resources may provide a data service having transmission speed of 155.52 Mbits/s (OC-3 with payload: 148.608 Mbits/s; overhead: 6.912 Mbits/s, including path overhead). Also, the one or more network resources may provide a data service having transmission speed of 622.08 Mbits/s (OC-12 with payload: 601.344 Mbits/s; overhead: 20.736 Mbits/s).

The network resources may symmetrically transmission of traffic loads, wherein the upstream transmission (e.g., transmission from customer premises) and downstream transmission (e.g., transmission to customer premises) may have the same bandwidth. For example, a network resource may assign an OC-3 standard bandwidth to the upstream transmission and downstream transmission. In other embodiments, the network resources may have disparate bandwidth for upstream transmission and downstream transmission. For example, a network resource may assign an OC-3 standard bandwidth for upstream transmission while assign an OC-12 standard bandwidth for downstream transmission. In such event, the analytical system 104 may select a transmission direction that may be more utilized in order to determine the quantity of network resources necessary to support an increase in services or traffic loads of communication network 106. For example, a ratio of traffic (or provisioned connections) over the bandwidth for the upstream transmission may be compared to a ratio of traffic (or provisioned connections) over the bandwidth for the downstream transmission and the analytical system 104 may select a transmission direction having a higher value for the determination of a quantity of network resources required to support an increase in services and traffic loads of the communication network 106.

For example, one or more network resources may be configured to provide a number of services for a plurality of customers. Also, the one or more network resources may have a predetermined bandwidth configured to provide a variety of services to customers based on a first come first served basis. In other embodiments, the bandwidth of the network resources may be apportioned among different services provided by the network resources. In an exemplary embodiment, apportioning of bandwidth of the network resources may be achieved by one or more predetermined rules (e.g., permanent virtual circuit ("PVC")/virtual local area network ("VLAN") rules or connection admission control ("CAC") rules).

The one or more attributes of the network resources may further include a bandwidth capacity associated with the network resources. In addition, the one or more attributes of the network resources may include threshold limits ($T_1$, $T_2$, or $T_3$). For example, the network resources may have one or more threshold limits. The one or more threshold limits of the network resources may be based on one or more variables. For example, the one or more threshold limits of the network resources may be based on bandwidth capacity (e.g., setting threshold limit to be 80% bandwidth capacity of the network resources). Also, the one or more threshold limits of the network resources may be based on a number of permanent virtual circuits or virtual local area networks provided by the network resources. The one or more threshold limits of the network resources may be based on a number of customers, sessions, or applications assigned to the network resources. The one or more threshold limits of the network resources may be based on different customer profiles (e.g., Quality of Service, assigned customer bandwidth). In other embodiments, the one or more threshold limits of the network resources may be based on a plurality of variables. For example, the one or more threshold limits of the network resources may be based on customer profiles (e.g., assigned customer bandwidth) and a number of permanent virtual circuits. In the event that one of the network resources reaches a threshold limit, the network resources may reach maximum capacity of services and traffic loads and additional network resources may be necessary to accommodate additional services or traffic load.

In order to analyze a domino impact of a growth of the communication network 106, the analysis may start at incoming services or traffic loads coupled to the edge or access network. The domino impact analysis of a growth of the communication network 106 may progress from the edge or access network to the application network. Also, the domino impact analysis of a growth of the communication network 106 may progress from edge or access network to a point between the edge or access network and the application network (e.g., at the aggregation network). For example, the domino impact analysis of a growth of the communication network 106 may progress from the edge or access network to a congregation point (e.g., located in the core network) of one or more of links 504 coupled to the edge or access network. In an exemplary embodiment, each of the one or more links 504 may have a plurality of incoming traffic loads from the edge or access network. In an exemplary embodiment, a start location and an end location within in a virtual private network or other special circuit of the domain 108 may be treated as a plurality of incoming services and traffic loads to their meeting point in one or more network resources. In other exemplary embodiments, the communication network 106 may have one or more black-box areas, where there is no visibility (e.g., detection or measurement) of network resources within the black-box areas. In order to analyze the domino impact of a growth of communication network 106 for the one or more black-box areas, the analysis may track each individual traffic stream at one or more entry and exit points. For example, the one or more black-box areas may be an intervening SONET or DWDM optical network connecting IP Routers/ATM Switches at the edge or access network.

In an exemplary embodiment, the communication network 106 may have more lower network resources ($R_L$) than higher network resources ($R_H$). For example, the higher network resources may be of a higher bandwidth granularity than the lower network resources. The higher network resources ($R_H$) may aggregate services and traffic loads from a plurality of lower network resources. A quantity of higher network resources ($R_H$) in the communication network 106 may be based at least in part on an over-subscription factor. For example, in an instant time within the communication network 106, only a percentage of the total customers may utilize one or more services or the customers may utilize a portion of allotted capacity (e.g., bandwidth). Therefore, the communication network 106 may over-subscribe a number of customers in order to fully utilize the network resources within the communication network 106.

In an exemplary embodiment, the network resources may be coupled via intra-network coupling and/or inter-network coupling. For example, intra-network coupling may be coupling of a plurality of network resource located within a single network (e.g., edge or access network ($N_1$), aggregation network ($N_2$), core network ($N_3$), or application network ($N_4$)). For example, the lower network resources ($R_L$) of a network may be coupled to one or more higher network resources ($R_H$) of the network. Also, inter-network coupling may be coupling of one or more network resource located in disparate networks. For example, the higher network resources ($R_H$) of a lower level network (LLN) may be coupled to the lower network resources ($R_L$) of a higher level network (HLN). In an exemplary embodiment, the lower network resource ($R_L$) of an aggregation network ($N_2$) may be coupled to the higher network resource ($R_H$) of an edge or access network ($N_1$) and the higher network resource ($R_H$) of the aggregation network ($N_2$) may be coupled to one or more lower network resources ($R_L$) of a core network ($N_3$). Also, one or more lower network resources ($R_L$) located in a network may be coupled to a plurality of higher network resources ($R_H$) of another network and vice-versa, in order to balance services and traffic loads, geographical routing, and/or network survivability. For example, a lower network resource ($R_L$) located in the aggregation network ($N_2$) may be coupled to a plurality of higher network resources ($R_H$) located in the edge or access network ($N_1$). Also, a higher network resource ($R_H$) located in the edge or access network ($N_1$) may be coupled to a plurality of lower network resources ($R_L$) located in the aggregation network ($N_2$).

For intra-network coupling, the higher network resources ($R_H$) may provide multiplexing or demultiplexing of the different services from the lower network resources ($R_L$). Also, the lower network resources ($R_L$) may provide a plurality of services (e.g., video services and data services). For example, a higher network resource ($R_H$) may multiplex services from a plurality of lower network resources ($R_L$) (e.g., first lower network resource ($R_L$) providing video services and a second lower network resource ($R_L$) providing data services). Also, a higher network resource ($R_H$) may demultiplex a plurality of services (e.g., video services, voice services, data services).

In an exemplary embodiment, the network resources may be a passive network element. The passive network element may not monitor the services and traffic loads transmitted through the passive network element and may not have one or more threshold limits. The passive network element may have a predetermined multiplexing factor (e.g., upstream transmission) or de-multiplexing factor (e.g., downstream transmission). For example, the passive network element may be a dense wavelength-division-multiplexing ("DWDM") combiner or splitter. The dense wavelength-division-multiplexing combiner or splitter may optically combine traffic loads from a plurality of network resources or optically split traffic load to the plurality of network resources.

The lower network resources located in a higher level network (e.g., aggregation network as shown in FIG. 5) may be coupled to the higher network resources located in a lower level network (e.g., edge or access network as shown in FIG. 5) via one or more links 504 (e.g., physical links). In the event that network resources are located in disparate networks, the lower network resources located in a higher level network may support all the services supported by the higher network resources located in a lower level network. In the event that a higher network resources located in a lower level network is coupled to a plurality of lower network resources located in a higher level network, the incoming traffic loads from the higher network resources may be divided and transmitted to the plurality of lower network resources located in a higher level network. The traffic loads from the higher network resources located at the lower network level may be divided based on one or more predetermined rules (e.g., type of services, load balancing, and network survivability etc). Also, a plurality of higher network resources located in disparate lower level networks may be coupled to a single lower network resource located in a higher level network. The lower network resources located in the higher level network may aggregate various services and incoming traffic loads from the plurality of higher network resources located in different lower level networks.

Figure 6:
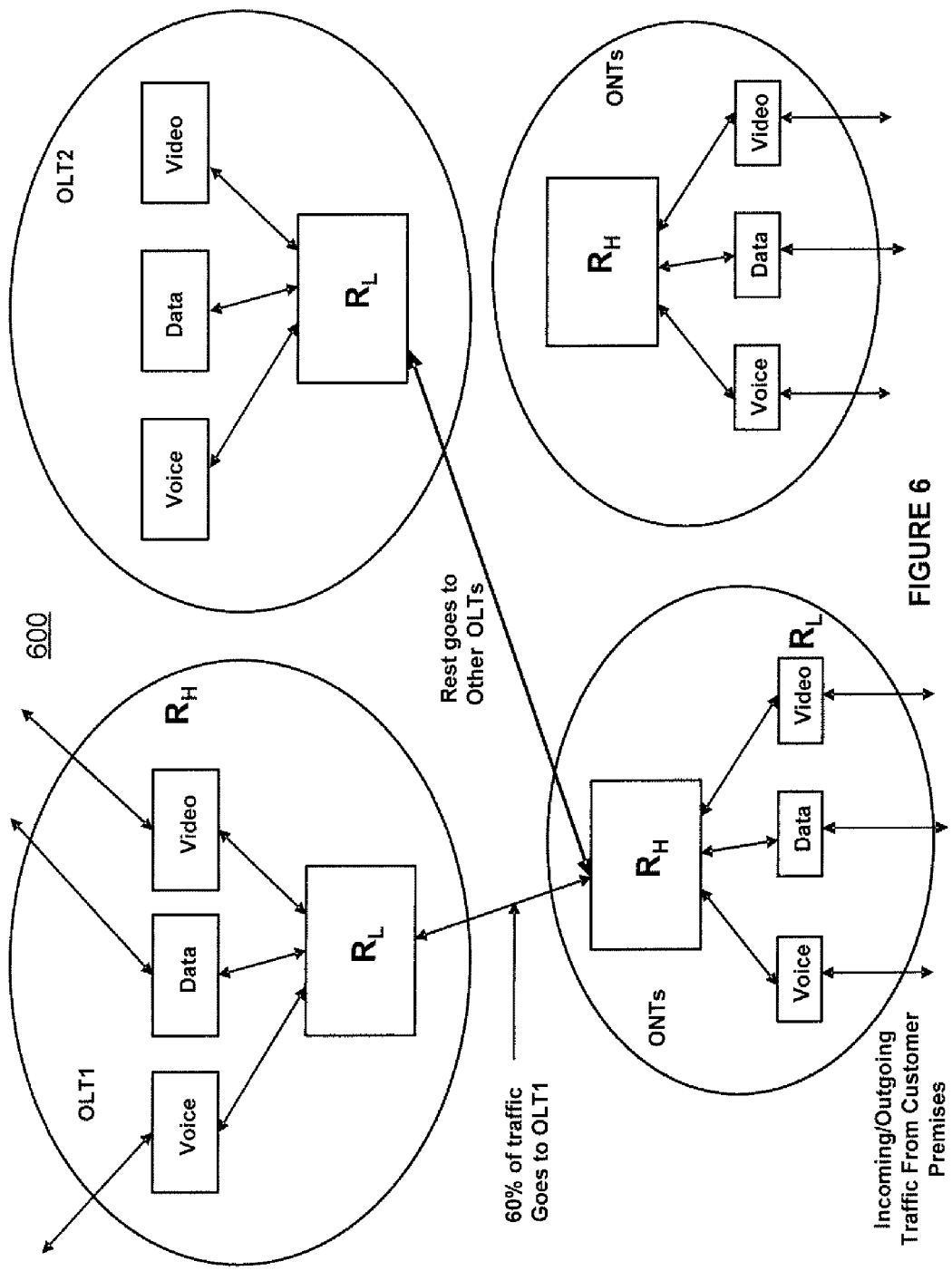
FIG. 6 is a schematic diagram illustrating a domino impact analysis of the communication network according to a particular embodiment.

FIG. 6 is a schematic diagram illustrating a domino impact analysis of the communication network according to a particular embodiment. FIG. 6 illustrates a passive optical network ("PON") 600. In an exemplary embodiment, the passive optical network 600 may be a fiber to the premises ("FTTP") network, a fiber to the home ("FTTH") network, a fiber optic services ("FIOS") network, and a full service access network ("FSAN"). The passive optical network 600 may provide a variety of services to customers, which may include voice services, data services, and video services. For example, the passive optical network 600 may provide voice services, data services, and video services by multiplexing video traffic with voice traffic and data traffic.

The passive optical network 600 may include one or more domains having a plurality of areas. For example, area 1 may be a first optical network terminal ("$ONT_1$"), area 2 may be a first optical line terminal ("$OLT_1$"), area 3 may be a second optical network terminal ("$ONT_2$"), and area 4 may be a second optical line terminal ("$OLT_2$"). In an exemplary embodiment, the first optical network terminal may be extended to or located near one or more customer premises. The first optical network terminal may be coupled to the first optical line terminal (e.g., Area 2) and the second optical line terminal (e.g., Area 4). The first optical network terminal may have three lower network resources. For example, the three lower network resources may include a voice network resource, a data network resource, and a video network resource. The three lower network resources of the first optical network terminal may be connected to a higher network resource of the first optical network terminal. The higher network resource may aggregate the services and traffic loads from the plurality of lower network resources. The second optical network terminals (e.g., Area 3) may provide similar services and traffic loads as the first optical network terminals. Also, the second optical network terminal may be coupled to the second optical line terminal and the first optical line terminal.

The aggregated services and traffic loads (e.g., voice service traffic, data service traffic, and video service traffic) at the higher network resource of the first optical network terminal (e.g., a lower level network) may be transmitted to the lower network resource of the first optical line terminal (e.g., a higher level network). In an exemplary embodiment, the first optical line terminal may be connected to a plurality of optical network terminal. The domino impact analysis of the growth of the passive optical network 600 may be described below in detail.

For example, the first optical network terminal may have 1000 voice lower network resources (e.g., voice service ports), 300 data lower network resources (e.g., data service ports), and 200 video lower network resources (e.g., video service ports). The bandwidth of the voice lower network resources may be 1 Mbits/s, the bandwidth of the data lower network resources may be 10 Mbits/s, and the bandwidth of the video lower network resources may be 15 Mbits/s. Also under a traffic monitoring domino impact analysis, the voice lower network resources may have a fill ratio (e.g., a fraction of the bandwidth used by the network resources) of 0.3, the data lower network resources may have a fill ratio of 0.15, and the video lower network resources may have a fill ratio of 0.2. The total bandwidth used by each service network resources may be calculated by multiplying a number of lower network resources associated with the service, a bandwidth of the lower network resources, and a fill ratio (e.g., a fraction of the bandwidth used by the network resources). For example, the total bandwidth used by voice service network resources may be equal to 300 Mbits/s (e.g., 1000 network resources*1 Mbits/s*0.3 fill ratio), the total bandwidth used by data service network resources may be equal to 450 Mbits/s (e.g., 300 network resources*10 Mbits/s*0.15 fill ratio), and the total bandwidth used by video service network resources may be equal to 600 Mbits/s (e.g., 200 network resources*15 Mbits/s*0.2 fill ratio). The total bandwidth required to support the three services (e.g., voice service, data service, and video service) may be 1350 Mbits/s (e.g., 300 Mbits/s bandwidth for voice services+450 Mbits/s bandwidth for data services+600 Mbits/s bandwidth for video services). In the event that the three services from the plurality of lower network resources are aggregated/multiplexed at a single higher network resource, the bandwidth required for the higher network resources may be equal to 1350 Mbits/s, for example, the total bandwidth of the three services.

The proportion of bandwidth used for each service at the higher network resources may be calculated by dividing the total bandwidth of the higher network resources (e.g., all three services) by the total bandwidth of each service. For example, the proportion of bandwidth used for each service may be 0.22 for voice service (e.g., 300 Mbits/s/1350 Mbits/s), 0.33 for data service (e.g., 450 Mbits/s/1350 Mbits/s), and 0.45 for video service (e.g., 600 Mbits/s/1350 Mbits/s). In the event that the bandwidth for the higher network resources may be 20 Mbits/s, a number of higher network resources may be calculated by dividing the total bandwidth needed for three services by the bandwidth of the higher network resources. In this exemplary embodiment, the number of higher network resources ($R_H$) may be 68 (e.g., by dividing 1350/20=67.5).

The domino impact analysis may be determined at the optical line terminal (e.g., higher level network). For example, the lower network resources located at the first optical line terminal (e.g., higher level network) may have a bandwidth similar to the higher network resources located at the first optical network terminal (e.g., lower level network), for example 20 Mbits/s or higher. Also, assuming only 60% of the services and traffic loads from the first optical network terminal may be transmitted to the first optical line terminal. The number of lower network resources located at the first optical line terminal may be calculated by multiplying a number of higher network resources located at the first optical network terminal (e.g., since the higher network resources located at the first optical terminal may have the same bandwidth as the lower network resources located at the first optical line terminal) by the percentage of the services and traffic loads received from the first optical network terminal (e.g., 60% transmission rate). In an exemplary embodiment, the number of lower network resources located at the first optical line terminal may be calculated as 68*0.60=40.8 or 41 lower network resources located at the first optical line terminal.

For example, the total number of lower network resources located at the first optical line terminal may be determined as 41, total bandwidth required for the lower network resources located at the first optical line terminal may be calculated. Continuing this example, the total bandwidth of the lower network resources located at the first optical line terminal may be calculated by multiplying the bandwidth of each of the lower network resources by the total number of lower network resources located at the first optical line terminal (e.g., 20 Mbits/s*41=820 Mbits/s).

In an exemplary embodiment, the higher level resources located at the first optical line terminal may have a higher bandwidth than the lower network resources located at the first optical line terminal. Also, the optical line terminal (OLT) may demultiplex a plurality of services (e.g., voice services, video services, or data services) via one or more lower network resources ($R_L$) and transmit the plurality of services to one or more higher network resources ($R_H$). The higher level resources located at the first optical line terminal may assign different bandwidth for each of the three services. For example, the higher level resources located at the first optical line terminal may assign 5 Mbits/s for voice services, 20 Mbits/s for data services, and 50 Mbits/s for video services. The bandwidth of the lower network resources may be allocated among disparate services (e.g., voice services, data services, and video services) provided by the first optical line terminal. For example, the lower network resources located at the first optical line terminal may assign 0.22 of the bandwidth to voice services, 0.33 of the bandwidth to data services, and 0.45 of the bandwidth to video services. The allocation of the bandwidth for each of the lower network resources located at the first optical line terminal may be stored in a database. The number of higher network resources needed for each service may be calculated by the total bandwidth for the lower network resources multiplied by a proportion of the bandwidth assigned to each service and divided by the bandwidth of one or more higher network resources ($R_H$) of the service. For example, the number of higher network resources may be calculated by 820 Mbits/s*0.22/5=37 higher network resources for voice services, 820*0.33/20=14 higher network resources for data services, and 820*0.45/50=8 higher network resources for video services. The higher network resources located at the first optical line terminal may be coupled to lower network resources located at a higher level network and the domino impact analysis for the higher level network may be determined by a similar process described above.

Figure 7:
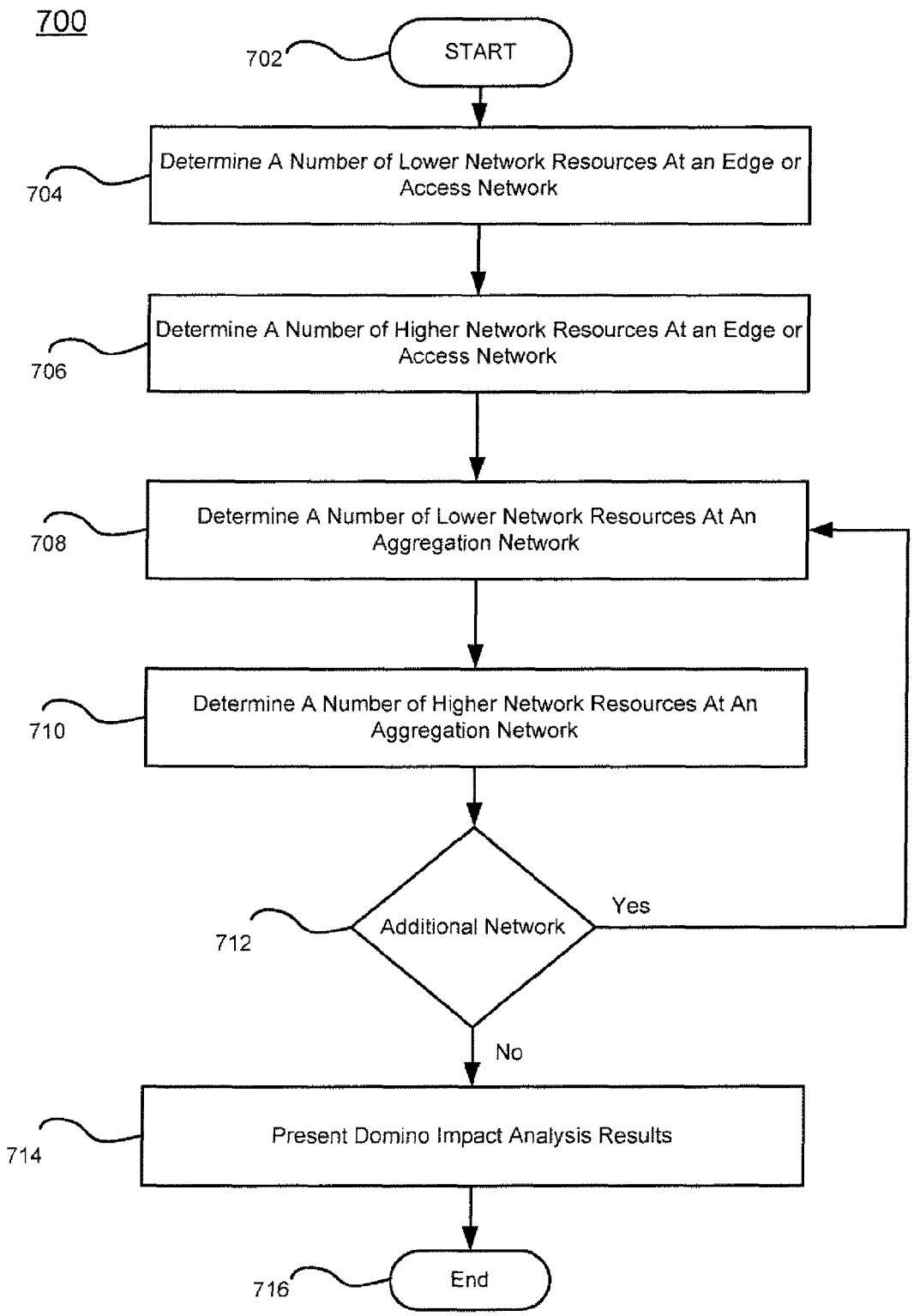
FIG. 7 is a flowchart illustrating the functionality for analyzing domino impact of the communication network growth according to a particular embodiment.

FIG. 7 is a flowchart illustrating the functionality for analyzing the domino impact of the communication network growth according to a particular embodiment. This exemplary method 700 may be provided by way of example, as there are a variety of ways to carry out the method. The method 700 shown in FIG. 7 can be executed or otherwise performed by one or a combination of various systems. The method 700 is described below may be carried out by the system and network shown in FIGS. 1-6, by way of example, and various elements of the system and network are referenced in explaining the example method of FIG. 7. Each block shown in FIG. 7 represents one or more processes, methods or subroutines carried out in exemplary method 700. Referring to FIG. 7, exemplary method 700 may begin at block 702.

At block 702, the method 700 for analyzing the domino impact of the communication network growth may begin.

At block 704, a number of lower network resources at an edge or access network for a domain 108 of the communication network 106 may be determined. For example, a network administrator may submit one or more queries/requests to analyze the domino impact of the growth of the communication network 106. For example, the network administrator may utilize a user device 102 to submit the one or more queries/requests to an analysis system 104. The collector module 208 of the analysis system 104 may collect network information from one or more domains 108 of the communication network 106. In an exemplary embodiment, the collector module 208 may collect network information from the analysis system 104 based at least in part on the one or more queries/requests. The analytical module 212 may process the collected network information in order to analyze the domino impact of the growth of the communication network 106. The domino impact analysis by the analytical module 212 may be started at the edge or access network. The communication network 106 may be divided into one or more domains 108 having a plurality of areas. Each area of the domain 108 may have various types of networks (e.g., edge or access network, aggregation network, core network, and application network) in order to support services and traffic loads offered by the one or more domains of the communication network 106. In an exemplary embodiment, a number of lower network resources at the edge or access network ($N_1$ network) may be determined using the following parameters:

q=a number of lower network resources ($R_L$) in a network, and r=a number of higher network resources ($R_H$) in a network.

For example, the number of lower network resources for the edge or access networks may be calculated based on incoming traffic loads from customer premises and other domains 108 in the communication network 106 coupled (e.g., provisioned connections) to the lower network resources of the analyzed domain 108 of the communication network 106. In an exemplary embodiment, each incoming provisioned connection may be assigned a lower network resource in the edge or access network. In the event that there are i number of incoming provisioned connections (e.g., determined by network policies) in the edge or access network, the number of lower network resources for the edge or access networks may be equal to i number of incoming provisioned connections.

For example, the i number of incoming provisioned connections in the edge or access network may represent current incoming traffic loads into the edge or access network and forecasted incoming traffic loads into the edge or access network in a predetermined period. After determining a number of lower network resources at the edge or access network for the domain 108 of the communication network 106 based on a number of incoming provisioned connections, the method 700 may proceed to block 706.

At block 706, a number of higher network resources of the edge or access network may be determined. For example, the higher network resources may receive incoming traffic loads from the lower network resources in the edge or access network. The number of higher network resources for the edge or access networks may be determined based on a number of lower network resources in the edge or access networks coupled to the higher network resources. In an exemplary embodiment, a plurality of lower network resources may be coupled to a single higher network resource. In other embodiments, a lower network source may be coupled to a plurality of higher network resources. The lower network resource may allocate the received incoming traffic loads between the plurality of higher network resources of the edge or access network. In an exemplary embodiment, a number of higher network resources at the edge or access network may be determined using the following parameters:

m=number of distinct set of lower network resources ($R_L$) (e.g., video services, data services, or voice services), n=number of distinct set of higher network resources ($R_H$), $(b_L)_m$=the bandwidth of the $m^{th}$ lower network resource ($R_L$), $(b_H)_n$=the bandwidth of the $n^{th}$ higher network resource ($R_H$), and $q_m = i_m$ is the quantity of the $m^{th}$ set of lower network resources ($R_L$) resource (e.g., determined previously at block 704).

$q_{mn}$ may represent a quantity of provisioned connections (e.g., a fraction of $q_m$) from the $m^{th}$ set of lower network resources ($R_L$) to the $n^{th}$ set of higher network resources ($R_H$), for example, 1000 provisioned connections for voice services, 300 provisioned connections for data services, and 200 provisioned connections for video services. The quantity of $m^{th}$ lower network resources ($R_L$) may be represented by the following formula while the parameters are as described above:

$$q_m = \sum_1^n q_{mn}.$$

In an exemplary embodiment, the quantity of higher network resources ($R_H$) of the edge or access network ($N_1$ network) may be determined using a provisioned connection method. For example, assuming that $r_n$ is the quantity of $n^{th}$ higher network resources ($R_H$) located within the edge or access network ($N_1$ network), $r_n$ may be calculated using the following formula:

$$r_n = \sum_1^m q_{mn} * [(b_L)_m / (b_H)_n].$$

In the event that the communication network 106 is oversubscribed, the above formula may be modified as follows:

$$r_n = \sum_1^m [(q_{mn}) / (o_{mn})] * [(b_L)_m / (b_H)_n].$$

For example $o_{mn}$ (e.g., $o_{mn} > 1$) may represent the oversubscription factor on the provisioned connections between the $m^{th}$ set of lower network resources ($R_L$)$_m$ and the $n^{th}$ set of higher network resources ($R_H$)$_n$, In other embodiments, the quantity ($r_n$) of the $n^{th}$ higher network resources ($R_H$) of the edge or access network ($N_1$ network) may be determined using monitoring traffic flow method.

$$r_n = \sum_1^m q_{mn} * f_{mn} * [(b_L)_m / (b_H)_n]$$

For example, $f_{mn}$ (e.g., $f_{mn} \leq 1$) may represent a fill ratio (i.e. fraction of the bandwidth consumed by the monitored traffic flow) of the provisioned connections between the $m^{th}$ lower network resources and the $n^{th}$ higher network resources. After determining a number of higher network resources at the edge or access network for the domain 108 of the communication network 106, the method 700 may proceed to block 708.

At block 708, a number of lower network resources of an aggregation network (e.g., a higher level network) may be determined. For example, the lower network resources of the aggregation network may be coupled to a plurality of higher network resources of the edge or access network (e.g., a lower level network). The higher network resources of the edge or access networks may be coupled to the lower network resources in the aggregation network. In an exemplary embodiment, each higher network resources of the edge or access networks may be coupled to each of the lower network resources in the aggregation network (e.g., one-to-one). The number of lower network resources located at the aggregation network may be represented by the following formula:

q=a number of higher network resources ($R_H$) of a lower level network (LLN) coupled to the lower network resources ($R_L$) of a higher level network (HLN) multiplied by a fraction of services and traffic loads transmitted to the lower network resources ($R_L$) of the higher level network (HLN).

For example, 60% of the services and traffic loads from the higher network resources of the edge or access network may be transmitted to the lower network resources of the aggregation network. In the event that there are 68 higher network resources in the edge or access network, the required lower network resources of the aggregation network may be 41 (e.g., 68 higher network resources*60% of the services and traffic loads). After determining a number of lower network resources at the aggregation network for the domain 108 of the communication network 106, the method 700 may proceed to block 710.

At block 710, a number of higher network resources of the aggregation network may be determined. For example, the number of higher network resources of the aggregation network may be determined using the same formulas in block 704 for calculating a number of higher network resources of the edge or access network. In an exemplary embodiment, the number of higher network resources of the aggregation network may be calculated using the formulas in block 704 based at least in part on the number of lower network resources of the aggregation network. After determining a number of higher network resources at the aggregation network for the domain 108 of the communication network 106, the method 700 may proceed to block 712.

At block 712, whether an additional network is coupled to the aggregation network is determined. For example, in the event that additional networks (e.g., core network and application network) are coupled to the aggregation network, the method 700 may proceed back to block 706 and repeat the method steps of block 706 and block 708. In the event that the no additional networks are coupled to the aggregation network, the method 700 may proceed to block 714.

At block 714, the domino impact analysis results of the growth of the communication network 106 may be presented to the network administrator via the user device 102. In an exemplary embodiment, the domino impact analysis results may be presented to the network administrator via a presentation module 206 of the analysis system 104. The network administrator may configure and update the communication network 106 based on the domino impact analysis.

At block 716, the method 700 may end.

The description above describes user devices, an analysis system, a communication network having network elements that are coupled to each other via one or more links (e.g., physical or logical), various networks within a domain of the communication network, and other elements for coupling customers to the communication network, some of which are explicitly depicted, others of which are not. As used herein, the term "module" may be understood to refer to executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof.

Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

The invention claimed is:

1. A method, comprising:
    collecting, via a collector module, network information from one or more domains of a communication network;
    processing, via an analytical module executing on a computing device comprising at least one processor, the network information in order to determine a domino impact of growth of the communication network, wherein processing the network information comprises determining a number of lower network resources and a number of higher network resources within plurality types of networks in the one or more domains of the communication network, and wherein the number of higher network resources is determined based on a provisioned connections method by:

$$r_n = \sum_{1}^{m} q_{mn} * [(b_L)_m / (b_H)_n]$$

wherein $r_n$ is the quantity of $n^{th}$ set of higher network resources, m is the number of sets of lower network resources, n is the number of sets of the higher network resources, $q_{mn}$ is a quantity of provisioned connections between the $m^{th}$ lower network resources and the $n^{th}$ higher network resources, $(b_L)_m$ is a bandwidth of the mth lower network resources, and $(b_H)_n$ is a bandwidth of the $n^{th}$ higher network resources; and
    outputting, via a presentation module, the processed network information collected from the one or more domains of the communication network.

2. The method of claim 1, wherein the number of higher network resources is further determined by:

$$r_n = \sum_{1}^{m} [(q_{mn})/(o_{mn})] * [(b_L)_m / (b_H)_n]$$

wherein $r_n$ is the quantity of higher network resources, m is the number of sets of lower network resources, n is the number of sets of the higher network resources, $q_{mn}$ is a quantity of provisioned connections between the $m^{th}$ set of lower network resource and the $n^{th}$ set of higher network resource, $o_{mn}$ is an over-subscription factor that is greater than 1, between the $m^{th}$ set of lower network resources and the $n^{th}$ set of higher network resource, $(b_L)_m$ is a bandwidth of the $m^{th}$ set of lower network resources, and $(b_H)_n$ is a bandwidth of the $n^{th}$ set of higher network resources.

3. The method of claim 1, wherein the quantity (q) of lower network resources is determined by:
q=a number of higher network resources of a lower level network coupled to the lower network resources of a higher level network multiplied by a fraction of services and traffic loads transmitted to the lower network resources of the higher level network.

4. The method of claim 1, wherein the plurality types of networks in the one or more domains of the communication network comprises an edge or access type network, an aggregation type network, a core type network, and an application type network.

5. The method of claim 1, wherein the lower network resources and the higher network resources comprises at least one of routers, switches, servers, and optical network terminals (ONT).

6. The method of claim 1, wherein the lower network resources are located closer to customer premises than the higher network resources.

7. A non-transitory computer readable storage media comprising code to perform the acts of the method of claim 1.

8. The method of claim 1, wherein the network information comprises at least one of a number of provisioned connections between the lower network resources and customer premises, bandwidth of the lower network resources, bandwidth of the higher network resources, a number of provisioned connections between the lower network resources and the higher network resources, over-subscription factors, fill ratios, services and traffic loads allocation percentage, and a number of types of networks in the one or more domains of the communication network.

9. The method of claim 8, wherein the quantity of lower network resources is determined based at least in part on the number of provisioned connections between the lower network resources and the customer premises.

10. A system, comprising:
at least one processor executing the following modules:
a collector module configured to collect network information from one or more domains of a communication network;
an analytical module configured to process the network information in order to determine a domino impact of growth of the communication network, wherein processing the network information comprises determining a number of lower network resources and a number of higher network resources within plurality types of networks in the one or more domains of the communication network, and wherein the number of higher network resource is determined based on a provisioned connections method by:

$$r_n = \sum_1^m q_{mn} * [(b_L)_m / (b_H)_n]$$

wherein $r_n$ is the quantity of $n^{th}$ higher network resources, m is the number of sets of lower network resources, n is the number of sets of the higher network resources, $q_{mn}$ is a quantity of provisioned connections between the $m^{th}$ lower network resources and the $n^{th}$ higher network resources, $(b_L)_m$ is a bandwidth of the $m^{th}$ lower network resources, and $(b_H)_n$ is a bandwidth of the $n^{th}$ higher network resources; and
a presentation module configured to output the processed network information collected from the one or more domains of the communication network.

11. The system of claim 10, wherein the number of lower network resources is determined based at least in part on a number of provisioned connections between the lower network resources and customer premises.

12. The system of claim 10, wherein the number of higher network resources is further determined by:

$$r_n = \sum_1^m [(q_{mn})/(o_{mn})] * [(b_L)_m / (b_H)_n]$$

wherein $r_n$ is the quantity of higher network resources, m is the number of sets of lower network resources, n is the number of sets of the higher network resources, $q_{mn}$ is a quantity of provisioned connections between the $m^{th}$ set of lower network resource and the $n^{th}$ set of higher network resource, $o_{mn}$ is an over-subscription factor that is greater than 1, between the $m^{th}$ set of lower network resources and the $n^{th}$ set of higher network resource, $(b_L)_m$ is a bandwidth of the $mk^{th}$ set of lower network resources, and $(b_H)_n$ is a bandwidth of the nth set of higher network resources.

13. The system of claim 10, wherein the quantity (q) of lower network resources is determined by:
q=a number of higher network resources of a lower level network coupled to the lower network resources of a higher level network multiplied by a fraction of services and traffic loads transmitted to the lower network resources of the higher level network.

14. The system of claim 10, wherein the plurality types of networks in the one or more domains of the communication network comprises an edge or access type network, an aggregation type network, a core type network, and an application network.

15. The system of claim 10, wherein the lower network resources are located closer to customer premises than the higher network resources.

16. A method, comprising:
collecting, via a collector module, network information from one or more domains of a communication network;
processing, via an analytical module executing on a computing device comprising at least one processor, the network information in order to determine a domino impact of growth of the communication network, wherein processing the network information comprises determining a number of lower network resources and a number of higher network resources within plurality types of networks in the one or more domains of the communication network, and wherein the quantity of higher network resources is determined based on monitoring traffic flow method by:

$$r_n = \sum_1^m q_{mn} * f_{mn} * [(b_L)_m / (b_H)_n]$$

wherein $r_n$ is the quantity of $n^{th}$ set of higher network resources, m is the number of sets of lower network resources, n is the number of sets of the higher network resources, $q_{mn}$ is a quantity of provisioned connections between the $m^{th}$ set of lower network resource and the $n^{th}$ set of higher network resource, $f_{mn}$ is a fill ratio of fraction of bandwidth used by services or traffic loads between the $m^{th}$ lower network resources and the $n^{th}$ higher network resources, $(b_L)_m$ is a bandwidth of the $m^{th}$ set of lower network resources, and $(b_H)_n$ is a bandwidth of the $n^{th}$ set of higher network resources; and outputting, via a presentation module, the processed network information collected from the one or more domains of the communication network.

17. A system, comprising:

at least one processor executing the following modules:

a collector module configured to collect network information from one or more domains of a communication network;

an analytical module, configured to process the network information in order to determine a domino impact of growth of the communication network, wherein processing the network information comprises determining a number of lower network resources and a number of higher network resources within plurality types of networks in the one or more domains of the communication network, and wherein the number of higher network resources is determined based on monitoring traffic flow method by:

$$r_n = \sum_1^m q_{mn} * f_{mn} * [(b_L)_m / (b_H)_n]$$

wherein $r_n$ is the quantity of $n^{th}$ set of higher network resources, m is the number of sets of lower network resources, n is the number of sets of the higher network resources, $q_{mn}$ is a quantity of provisioned connections between the $m^{th}$ set of lower network resource and the $n^{th}$ set of higher network resource, $f_{mn}$ is a fill ratio of fraction of bandwidth used by services or traffic loads between the $m^{th}$ lower network resources and the $n^{th}$ higher network resources, $(b_L)_m$ is a bandwidth of the $m^{th}$ set of lower network resources, and $(b_H)_n$ is a bandwidth of the $n^{th}$ set of higher network resources; and a presentation module configured to output the processed network information collected from the one or more domains of the communication network.

* * * * *